United States Patent [19]

Wiesler

[11] 4,174,847

[45] Nov. 20, 1979

[54] PRECISION CENTERING DEVICE

[75] Inventor: Mordechai Wiesler, Lexington, Mass.

[73] Assignee: Teledyne, Inc., Hawthorne, Calif.

[21] Appl. No.: 859,734

[22] Filed: Dec. 12, 1977

[51] Int. Cl.² ............................................. B23B 31/16
[52] U.S. Cl. ...................................... 279/1 L; 279/3; 279/112; 269/21; 269/111
[58] Field of Search .................... 279/3, 1 L, 112, 110, 279/68, 16; 269/21, 42, 111; 33/180 R

[56] References Cited

U.S. PATENT DOCUMENTS

| 933,071 | 9/1909 | Helman | 279/112 X |
|---|---|---|---|
| 2,940,764 | 6/1960 | Krantz | 279/1 L |
| 3,167,326 | 1/1965 | Heessels | 279/3 |
| 3,460,822 | 8/1969 | Link | 279/3 X |

Primary Examiner—Gil Weidenfeld
Attorney, Agent, or Firm—Morse, Altman, Oates & Bello

[57] ABSTRACT

A precision centering device with a pair of relatively movable plates forming a guideway for four relatively movable guides. A tapered centering port having a rectangular profile is formed by the guides which are constrained for mutual coacting movement by the plates. The relative positions of the movable plates define the geometric shape of the centering port and the relative locations of the guides determine the size of the centering port. A reciprocating collet configured to carry a semiconductor chip is received within the centering port at the center thereof. As the collet moves downwardly, the chip is guided through the tapered port and is centered on the collet.

12 Claims, 4 Drawing Figures

4,174,847

PRECISION CENTERING DEVICE

BACKGROUND OF THE INVENTION

1. Field of the Invention:

The present invention relates to positioning devices and, more particularly, is directed towards precision positioning devices.

2. Description of the Prior Art:

In the manufacturing industry, often times it is necessary to precisely position articles of manufacture during production. For example, during production of semiconductor devices, semiconductor chips are separated from a monolithic wafer and precise positioning of the chips is required for further processing. Vacuum collets and reciprocating needles have been used for separating semiconductor chips. The separated chips are carried to various stations for further processing such as wire bond, packaging and the like. During such processing steps, the semiconductor chips must be positioned precisely at the center of the vacuum collet. At times, the chips are not picked up at the center of the vacuum collet and further processing of the chips is hampered. Also, fixtures for centering the chips require frequent readjustment to ensure proper positioning. A need has arisen for a precise positioning device which overcomes the disadvantages and limitations of prior art devices.

SUMMARY OF THE INVENTION

It is an object of the present invention to provide a precision positioning device.

Another object of the present invention is to provide a precision centering device.

A further object of the present invention is to provide an adjustable precision centering device for centering semiconductor chips on a vacuum collet. The centering device includes a pair of relatively movable plates that are constrained in mating relationship by a frame. Adjacent edges of the plates are cut out to form a guideway for four relatively movable guides which are constrained for mutual coacting movement within the guideway. A tapering centering port having a rectangular profile is bounded by inner edges of the guides. The relative position of the plates define the geometric shape of the centering port and the relative position of the guides govern the size of the centering port. For a given position of the plates, the center of the geometric shape of the centering port remains at the same point as the mutually coacting guides are moved to vary the size of the centering port. A reciprocating vacuum collet configured to carry a semiconductor chip is received within the centering port at the center thereof. As the vacuum collet moves downwardly, a chip carried thereon is guided through the tapered port and is centered on the collet.

Other objects of the present invention will in part be obvious and will in part appear hereinafter.

The invention accordingly comprises the apparatuses and systems, together with their parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
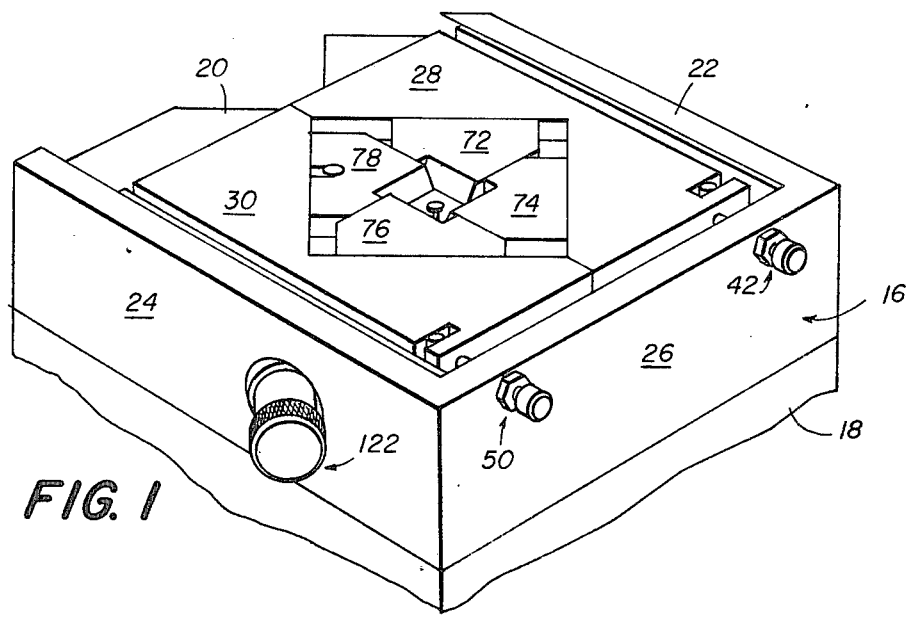
FIG. 1 is a perspective view of a precision centering device embodying the invention.
Figure 2:
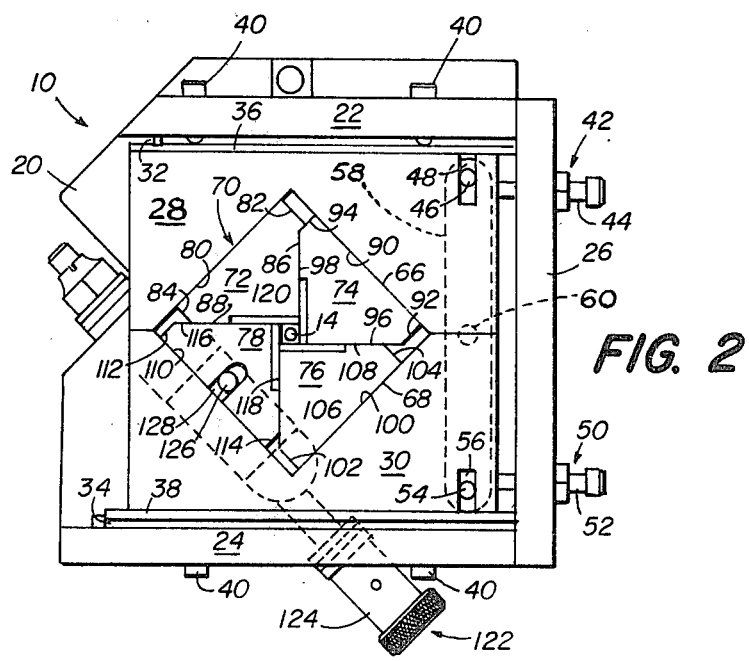
FIG. 2 is a top plan view of FIG. 1.

Referring now to the drawings, particularly FIGS. 1 and 2, there is shown a precision positioning device 10 made in accordance with the present invention. In the illustrated embodiment, by way of example, precision positioning device 10 is a precision centering device for centering a semiconductor chip 12 on a collet 14, for example a vacuum collet. Center device 10 is organized about a base 16 which is carried by a support 18. Base 16 includes a substantially rectangular body 20 with sidewalls 22, 24 and a rear wall 26 which form a substantially rectangular, open ended structure that is configured to receive a pair of plates 28, 30. A pair of channels 32 and 34 are formed in body 20 adjacent to and parallel with sidewalls 22 and 24, respectively. A laterally movable rib 36 received within channel 32 is disposed between sidewall 22 and plate 28, the upper face of rib 36 being substantially flush with the upper face of sidewall 22. A laterally movable rib 38 received within channel 34 is disposed between sidewall 24 and plate 30, the upper face of rib 38 being substantially flush with the upper face of sidewall 24. Adjusting devices 40, for example bolts, received within sidewalls 22, 24 engage ribs 36, 38 for clamping plates 28 and 30 in fixed positions.

A positioning device 42 having an adjusting member 44 which extends through an opening in rear wall 26 and contacts plate 28 is provided for moving plate 28 along an axis that is parallel to a longitudinal axis of sidewall 22. A positioning device 50 having an adjusting member 52 which extends through an opening in rear wall 26 and contacts plate 30 is provided for moving plate 30 along an axis that is parallel to a longitudinal axis of sidewall 24. A bar 58, which is pivoted on body 20 by a pin 60, is provided with a pair of studs 46 and 54 at opposite ends thereof. Stud 46 is slidably received within a slot 48 formed in plate 28 and stud 54 is slidably received within a slot 56 formed in plate 30. When positioning devices 42 and 50 are turned in opposite directions, bar 58 pivots about pin 60 and studs 46 and 54 slide oppositely in their respective slots 48 and 56. In consequence, plates 28 and 30 move relative to one another in unison and in opposite directions.

When adjusting devices 40 are turned into sidewalls 22 and 24, ribs 36 and 38 are pressed against plates 28 and 30, whereby the plates are clamped. Plate 28 is formed with an opening 66, for example a substantially triangular opening at one side thereof, and plate 30 is formed with an opening 68, for example a substantially triangular opening at one side thereof. Openings 66 and 68 form an opening 70 which is bounded by plates 28 and 30. In the illustrated embodiment, triangular openings 66 and 68 face one another and form a polygonal opening 70 having a substantially square profile when the rear edges of plates 28 and 30 are aligned. In an alternative embodiment, plates 28 and 30 are replaced with a single plate having an interior opening. As will be seen in FIG. 2, square opening 70 is positioned towards the forward edge of plates 28 and 30. That is, the closed segment between the rearward edge of plates 28, 30 and opening 70 is larger than the closed segment between the forward edges of plates 28, 30 and opening 70. Opening 70 constitutes a closed guideway for four relatively movable guides 72, 74, 76 and 78, adjacent edges of the guides abutting relationship for mutual coacting movement.

Figure 3A:
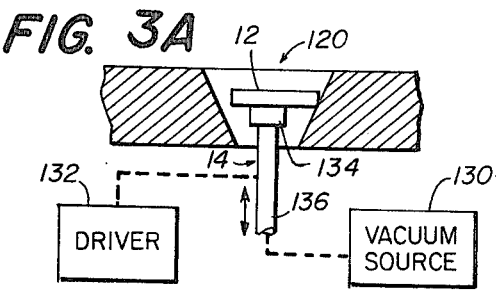
FIG. 3-A and 3-B are schematic diagrams illustrating certain principles of the invention.
Figure 3B:
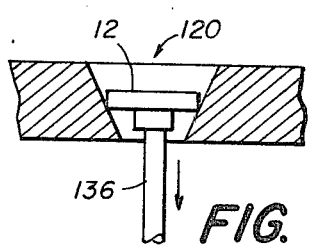

As shown in the top plan view of FIG. 2, guides 72, 74, 76 and 78 have congruent profiles and define pentagonal structures. Guide 72 includes a base 80, a pair of parallel sides 82, 84 that are perpendicular to base 80, and a pair of working sides 86, 88 that are perpendicular to one another. In the illustrated embodiment, the length of side 82 is one and one half times the length of side 84. Guide 74 includes a base 90, parallel sides 92, 94 and working sides 96, 98; guide 76 includes a base 100, parallel sides 102, 104 and working sides 106, 108; and guide 78 includes a base 100, parallel sides 112, 114 and working sides 116, 118. Bases 80, 90 rest against the sides of opening 66 and bases 100, 110 rest against the sides of opening 68. Working sides 86,98; 96,108; 106,118; and 116,88 are in mating engagement. Guides 72, 74, 76 and 78 are constrained by plates 28 and 30 for mutual coacting movement and form an internal centering port 120. As best shown in FIG. 3-A and 3-B, portions of each working side 86, 88, 96, 98, 106, 108, 116 and 108 are beveled, whereby port 120 formed therebetween defines a tapered opening having an enlarged upper entrance. The size of opening 120 is governed by the relative positions of guides 72, 74, 76 and 78.

A guide positioning device 122 having an adjusting member 124 that is mounted to body 20 and a pin 126 that is received within a slot 128 formed in guide 78 is provided for moving guides 72, 74, 76 and 78. As adjusting member 124 is turned, pin 126 engages slot 128 and slides plate 78 along the face of opening 68. As plate 78 is moved by guide positioning device 122, guides 72, 74 and 76 are moved also. Guides 74, 78 move along parallel axes and guides 72, 76 move along parallel axes. The axes along which guides 74, 78 slide are perpendicular to the axes along which guides 72, 76 slide. As viewed in FIG. 2, when guide positioning device 122 is turned so that pin 126 travels in a northwest direction, guide 78 moves northwesterly, guide 72 moves northeasterly, guide 74 moves southeasterly and guide 76 moves southwesterly. As guides 72, 74, 76 and 78 move in the directions just described, opening 120 becomes larger. When guides 72, 74, 76 and 78 move in opposite directions, opening 120 becomes smaller.

In the illustrated embodiment, openings 66 and 68 are in alignment, opening 70 has a square profile and opening 120 has a square profile. The geometric shape of the opening 120 is determined by the geometric shape of opening 70 which is governed by the relative positions of plates 28 and 30. For example, if openings 66 and 68 are not in alignment, opening 120 has a rectangular profile. The profile of opening 70 is such that the working edges of opening 70, which abut guides 72, 74, 76 and 78, lie in intersecting paths that form a polygonal opening. The size of opening 120 is controlled by the relative positions of guides 72, 74, 76 and 78. In the illustrated embodiment, the center of square opening 120 remains at the same point as the size of opening 120 changes for various relative positions of guides 72, 74, 76 and 78.

In one example of operation of precision centering device 10, positioning devices 42 and 50 are adjusted so that opening 70 has a square profile. Next, ribs 36 and 38 are clamped against plates 28 and 30 by turning adjusting devices 40. Then, guide positioning device 122 is turned until opening 120 is at a desired size. As previsously indicated, vacuum collet 14 is positioned at the center of opening 120 and carries semiconductor chip 12 which is to be centered thereon.

Referring now to FIGS. 3-A and 3-B, it will be seen that vacuum collet 14 is mounted to support 18 and is connected to a vacuum source 130 and a driver 132. Vacuum collet 14 includes a reciprocating shaft 134 having a head 136 onto which semiconductor chip 12 is held. It is to be noted that semiconductor chip 12 is slidable on the upper face of head 136. As shown in FIG. 3-A, semiconductor chip 12 is carried on head 136 at one side thereof. As shaft 136 moves downwardly, FIG. 3-B, the tapered edges of opening 70 centers semiconductor chip 12 on head 136. In an alternative embodiment, vacuum collet 14 is positioned above opening 70. In this case, semiconductor chip 12 is centered within opening 70 by being pushed therein from the top rather than being drawn inwardly from the bottom.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A precision positioning device comprising:
   (a) a base;
   (b) two plates mounted on said base, said plates mounted for relative movement in side-by-side relationship on said base, an opening defining a guideway formed in said plates, said opening formed between said plates, the profile of said opening governed by the relative position on said plates;
   (c) a plurality of relatively movable guides constrained by said guideway for mutual coacting movement, a port of predetermined geometrical configuration formed by said guides; and
   (d) position means connected to at least one of said guides for moving each of said guides, said geometrical configuration of said port governed by the profile of said opening, the size of said port determined by the relative positions of said guides.

2. The precision positioning device as claimed in claim 1 wherein the number of said guides is four.

3. The precision positioning device as claimed in claim 2 wherein said opening has a square profile and said port has a square profile.

4. The precision positioning device as claimed in claim 3 wherein said guides have congruent pentagonal profiles, each said guide having a base, a pair of parallel sides that are perpendicular to said base, and a pair of working sides which are perpendicular to one another, at least a portion of each said working side bounding said port.

5. A precision positioning device comprising:
   (a) a base;
   (b) at least two plates mounted on said base, said plates mounted for relative movement on said base, said plates forming an opening which defines a guideway, the profile of said opening governed by the relative positions of said plates;
   (c) a plurality of relatively movable guides constrained by said guideway for mutual coacting movement, a port of predetermined geometrical configuration formed by said guides; and (d) position means operatively connected to at least one of said guides for controlling the relative positions of said guides, said geometrical configuration of said port governed by the profile of said opening, the size of said port determined by the relative positions of said guides.

6. A precision device for centering a workpiece, said device comprising:

(a) a base;

(b) at least one plate mounted on said base, an opening formed in said plate, said opening defining a guideway;

(c) a plurality of relatively movable guides constrained by said guideway in abutting relationship for mutual coacting movement, a centering port of predetermined geometrical configuration formed by said guides;

(d) position means connected to at least one of said guides for moving each of said guides, said geometrical configuration of said port governed by the profile of said opening, the size of said port determined by the relative positions of said guides; and (e) collet means constrained for reciprocating movement within said port at the center thereof, said collet means configured to hold the workpiece.

7. The precision centering device as claimed in claim 6 wherein said port has tapered sides forming an enlarged entrance.

8. The precision centering device as claimed in claim 7 wherein the number of said plates is two and the number of said guides is four, said plates mounted in side-by-side relationship on said base, said plates constrained for relative movement in unison and in opposite directions on said base, said opening formed between said plates, said guides having congruent profiles, said port having a rectangular profile, each said guides being one wall of said port.

9. The precision centering device as claimed in claim 6 wherein a first of said guides is movable along a first axis, a second of said guides is movable along a second axis, a third of said guides is movable along a third axis, and a fourth of said guides is movable along a fourth axis, said first axis parallel to said second axis, said third axis parallel to said fourth axis, said first axis perpendicular to said third axis.

10. The precision centering device as claimed in claim 9 wherein said port has a rectangular profile, said first guide and said second guide constituting two opposite walls of said port, said third guide and said fourth guide constituting the other two opposite walls of said port.

11. The precision centering device as claimed in claim 10 wherein said position means is connected to said first guide, said position means moving said first guide along said first axis, said first guide moving said third guide, said third guide moving said second guide and said second guide moving said fourth guide.

12. The precision centering device as claimed in claim 11 wherein said port is a tapered port having a square profile with an enlarged entrance.

* * * * *